Nov. 9, 1948.   A. G. McNEILL   2,453,525
MEDICINE ADMINISTERING SPOON
Filed Sept. 22, 1945

INVENTOR.
ALBERT GEORGE McNEILL
BY Joshua R. H. Potts
HIS ATTORNEY.

Patented Nov. 9, 1948

2,453,525

UNITED STATES PATENT OFFICE 2,453,525

MEDICINE ADMINISTERING SPOON

Albert George McNeill, Philadelphia, Pa., assignor to Bachmann Bros., Inc., Philadelphia, Pa., a corporation of Pennsylvania Application September 22, 1945, Serial No. 617,971

7 Claims. (Cl. 30—125)

This invention relates to a medicine administering spoon which is designed primarily for use in administering medicine to very small children or animals who cannot balance the advantages to be obtained from corrective medicine against the momentary unpleasantness of the taste of the medicine.

Too, children of more advanced age may sometimes be relatively fractious, and in such cases the use of the ordinary teaspoon to administer medicines is highly unsatisfactory, due to the fact that the medicine may be spilled and damage the clothing, or at least fail to accomplish its desired purpose.

A broad object of this invention is the provision of a medicine administering spoon which can be used to measure desired quantities, and then be used directly as an injector instead of being offered to the patient to "take."

A more limited object of this invention is the provision of a medicine administering spoon in which the medicine can be held free from spillage hazards and yet ready for instantaneous administration to the patient at precisely the right time.

Other objects and advantages of the invention will become apparent as this description proceeds in connection with the accompanying drawings in which—

Figure 1:
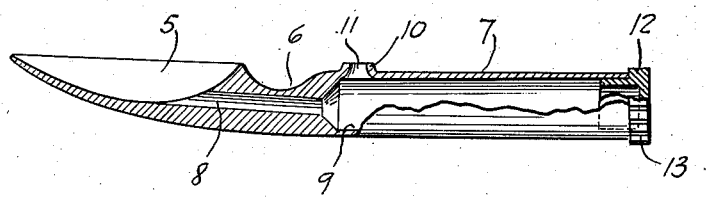
Figure 1 is a longitudinal sectional view with portions indicated in side elevation.
Figure 2:
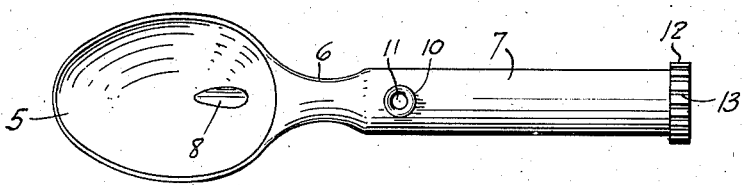
Figure 2 is a top plan view.
Figure 3:
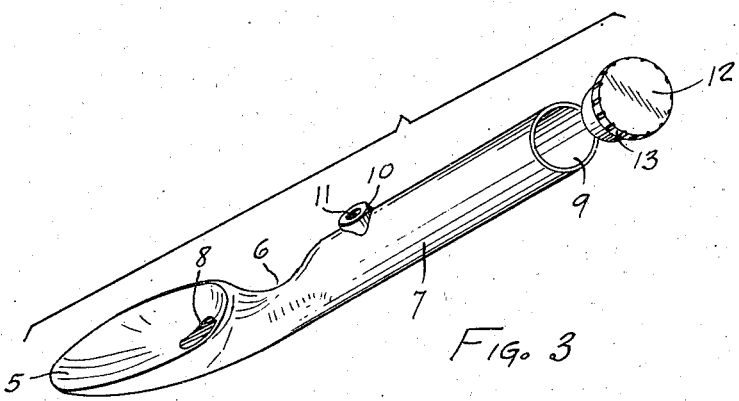
Figure 3 is a perspective view illustrating the provision for cleaning the medicine containing chamber.

Referring now to Figure 1, my medicine administering spoon is formed preferably of polystyrene or other material commonly called plastic material, capable of withstanding any solvent effects of the normal antiseptic or sterilizing solutions.

My spoon is provided with a bowl 5 connected by a shank 6 to a hollow handle 7.

Opening into the lower portion of the bowl 5 is a conduit 8 which extends through the shank 6 and communicates at its opposite end with a medicine chamber 9 formed in the hollow handle 7. Adjacent the point where conduit 8 communicates with the chamber 9, and on the upper portion of handle 7 so as to open in the same direction as the bowl 5, a boss 10 having a vent opening 11 extending therethrough, is provided. A removable plug 12 having a knurled periphery 13 closes the end of chamber 9 opposite the end which is in direct communication with conduit 8 and vent opening 11.

From the foregoing description and drawings, it is apparent that my medicine administering spoon can be held in the position indicated in Figure 1 while medicine is poured directly into the bowl 5 while a finger is held over the vent opening 11. Thus, with correct sizing of the bowl 5 and conduit 8, a known amount of medicine can be measured, and when the finger is removed from vent opening 11, the medicine will flow into the chamber 9 when the spoon is tipped slightly in a clockwise direction from that shown in Figure 1.

When the medicine has gone into the chamber 9, the finger is replaced upon the boss 10 to close vent opening 11, and then the spoon may be maneuvered into administering position and held ready for instant release of the finger from the boss 10, when the medicine will run from chamber 9 down to vent opening 11 and the bowl 5 will then serve to funnel the medicine into the mouth of the patient.

Due to the fact that boss 10 is raised from the wall of handle 7, there is no contact between the finger tip and the medicine in chamber 9, and plug 12 may be removed from the chamber 9 to wash out the chamber and conduit 8 so that it may be sterilized for subsequent use.

While I have shown and described my preferred form of construction, I do not wish to be limited to the precise details shown and described herein, but wish to avail myself of all variations coming properly within the scope of the appended claims.

What is claimed is:

1. A medicine administering spoon comprising a bowl, a handle having a medicine chamber therein, a conduit communicating between the interior of said bowl and said medicine chamber, the upper portion of said handle being formed with a vent opening, said vent opening being in the form of a boss of sufficient length to arrest enough air to maintain a bubble of air in the vent opening which will serve to prevent the medicine from contacting the finger of the user placed over said vent opening.

2. A medicine administering spoon comprising a bowl, a handle having a medicine chamber therein, a conduit communicating between the deepest portion of said bowl and said chamber, and a vent conduit communicating between the interior of said chamber and the atmosphere.

3. A medicine administering spoon comprising a bowl, a handle portion having a medicine chamber therein, and a conduit communicating between said bowl and the interior of said medicine chamber, said handle portion having a vented boss thereon, such vent boss being of sufficient extent to arrest enough air to maintain a bubble in said vent boss sufficient to prevent the medicine from contacting the finger of the user placed over said vent boss.

4. A medicine administering spoon comprising a bowl, a handle portion having a closed medicine chamber therein, a medicine conduit communicating between said bowl and said chamber, and a vent conduit communicating between the atmosphere and the interior of said chamber adjacent the entrance of said medicine conduit into said chamber.

5. A medicine administering spoon comprising a bowl, a handle connected with said bowl and having a medicine chamber therein, vent means for admitting air to said chamber to permit ready flow of liquid medicine from the chamber into the bowl of the spoon.

6. A spoon for administering liquid medicine having a bowl and a communicating medicine chamber in the handle thereof, a boss formed on said handle near the outlet from said chamber and having a vent opening therein, such boss being of sufficient height as to arrest enough air to maintain a bubble in said vent opening which will prevent the medicine from contacting the finger of the user placed over said vent opening.

7. A spoon for administering liquid medicine having a bowl and a handle, the handle having a chamber therein communicating with said bowl, vent means for admitting air to said chamber to facilitate the flow of liquid from said chamber, such venting means including a boss having a vent opening therein, the boss being of sufficient height as to arrest sufficient air to maintain a bubble of air therein which will prevent the liquid contacting the finger of the user when placed over said vent opening, and a removable closure for said chamber permitting cleaning and rinsing of the spoon.

ALBERT GEORGE McNEILL.

REFERENCES CITED

The following references are of record in the file of this patent:

UNITED STATES PATENTS

| Number | Name | Date |
|---|---|---|
| 107,419 | Spencer | Sept. 13, 1870 |
| 253,146 | Wilson | Jan. 31, 1882 |
| 1,000,178 | Kahl | Aug. 8, 1911 |
| 2,252,119 | Edmonds | Aug. 12, 1941 |